(12) United States Patent
Williams et al.

(10) Patent No.: US 12,497,190 B2
(45) Date of Patent: Dec. 16, 2025

(54) AUTOMATIC RETRACTABLE CENTER CONSOLE SYSTEM FOR AN AIRCRAFT

(71) Applicant: Textron Aviation Inc., Wichita, KS (US)

(72) Inventors: Merril Binford Williams, Wichita, KS (US); Frank Joseph Rowe, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 17 days.

(21) Appl. No.: 18/767,951

(22) Filed: Jul. 9, 2024

(65) Prior Publication Data

US 2025/0019088 A1 Jan. 16, 2025

Related U.S. Application Data

(60) Provisional application No. 63/513,626, filed on Jul. 14, 2023.

(51) Int. Cl.
*B64D 43/00* (2006.01)
(52) U.S. Cl.
CPC .................................. *B64D 43/00* (2013.01)
(58) Field of Classification Search
CPC ...................................................... B64D 43/00
See application file for complete search history.

(56) References Cited

U.S. PATENT DOCUMENTS

| 4,961,548 | A | 10/1990 | Adams et al. | |
|---|---|---|---|---|
| 8,894,120 | B2 | 11/2014 | Lechkun et al. | |
| 9,248,759 | B2 | 2/2016 | Brand et al. | |
| 9,663,038 | B2 | 5/2017 | Mather et al. | |
| 10,611,485 | B2 | 4/2020 | Emrich et al. | |
| 11,884,229 | B1 * | 1/2024 | Faruque | B60R 7/04 |
| 2022/0134959 | A1 * | 5/2022 | Harmon | B60R 7/04 |
| | | | | 296/37.15 |
| 2022/0144177 | A1 * | 5/2022 | Thomas | B60R 7/04 |

FOREIGN PATENT DOCUMENTS

EP 0374737 B1 * 10/1992 ............. B64D 11/00

* cited by examiner

*Primary Examiner* — Nabil H Syed
(74) *Attorney, Agent, or Firm* — Avek IP, LLC

(57) ABSTRACT

A system for retracting a center console of an aircraft having a cockpit with an interior area includes the center console being positioned within the interior area of the cockpit and supporting one or more aircraft controls; a mechanism supporting the center console and to facilitate movement of the center console between an extended position and a retracted position; a control system for operating the mechanism to facilitate movement, the control system having at least one sensor for monitoring the interior space of the cockpit; the at least one sensor is to determine when a person is entering the cockpit; and the control system is to activate movement of the center console to the retracted position upon the sensor determining the person is entering the cockpit.

17 Claims, 4 Drawing Sheets

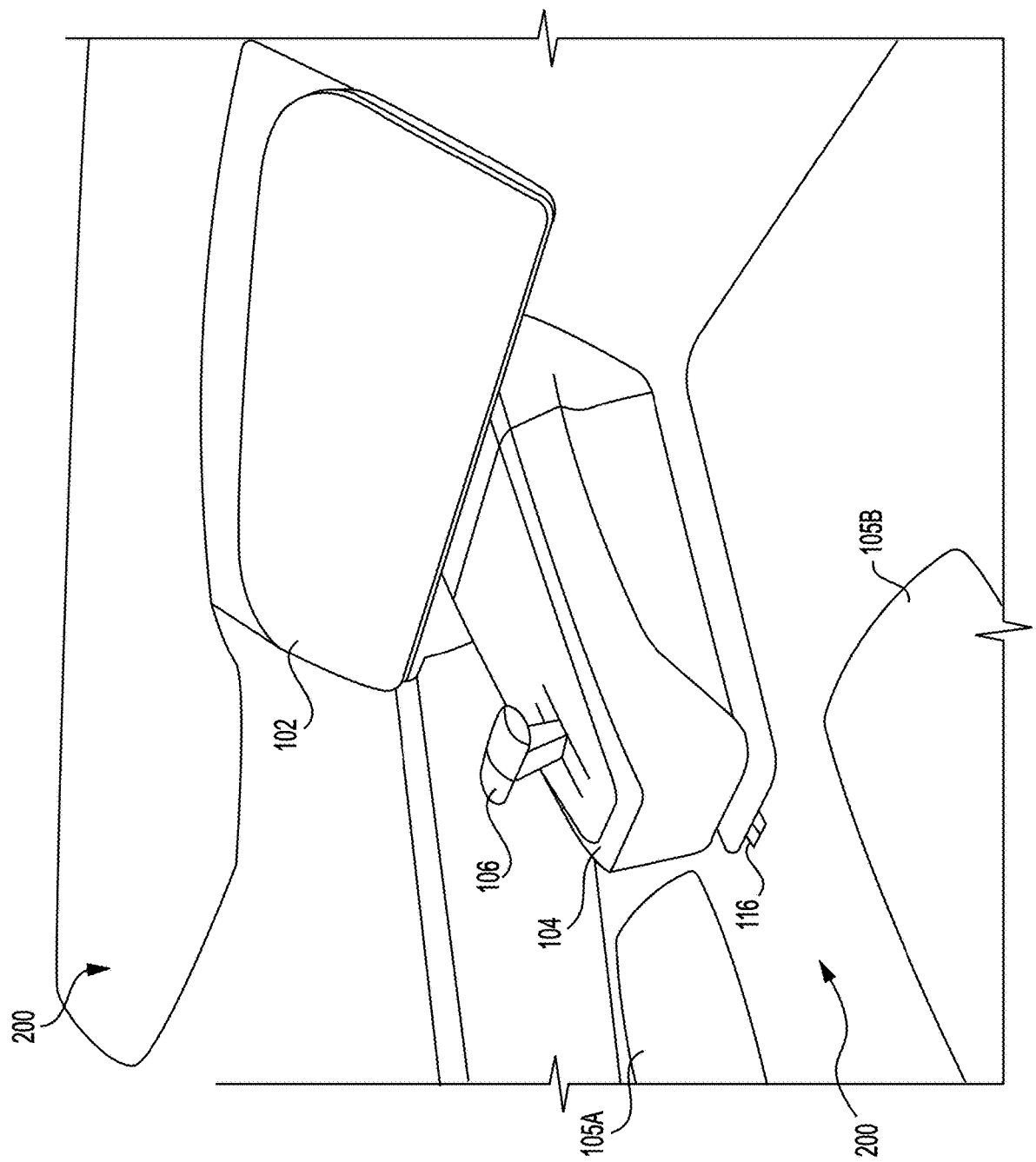

AUTOMATIC RETRACTABLE CENTER CONSOLE SYSTEM FOR AN AIRCRAFT

CROSS REFERENCE TO RELATED APPLICATIONS

This application claims the benefit of priority of U.S. Provisional Patent Application No. 63/513,626, filed Jul. 14, 2023, the disclosure of which is herein incorporated by reference in its entirety.

BACKGROUND

1. Field

Embodiments of the disclosure relate to aircraft consoles and power quadrants, and in particular to an automatic retractable center console system for an aircraft which provides a retractable center console for easier cockpit ingress and egress.

2. Related Art

Aircraft consoles and/or power quadrants are known in the art and provide a support structure for aircraft controls, interfaces, displays, etc. For example, U.S. Pat. No. 4,961,548 to Adams et al. describes a console system for an aircraft with a pedestal to provide a mechanism to adjust the console, the console being positioned in front of a pilot. Consoles are also known in the automotive industry. For example, U.S. Pat. No. 8,894,120 to Lechkun et al. and U.S. Pat. No. 9,663,038 to Mather et al. both describe a center console for an automobile, the consoles each having moving parts for access and adjustability and are designed for storage.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In embodiments, the disclosure relates to a system for retracting a center console of an aircraft, the system comprising a cockpit of the aircraft forming an interior area and the center console being positioned within the interior area of the cockpit, the center console supporting one or more aircraft controls. The center console is supported by one or more mechanisms configured to facilitate movement of the center console between an extended position and a retracted position. A control system is provided for operating the facilitation of movement, the control system having at least one sensor for monitoring the interior space of the cockpit. The at least one sensor is configured to determine when a person enters the cockpit; and the control system is configured to activate movement of the center console to the retracted position upon the sensor determining the person has entered the cockpit.

In embodiments, the disclosure further relates to a method of easing cockpit ingress and egress. First, a center console is mounted within the interior area of the cockpit via one or more mechanisms configured to facilitate movement of the center console between an extended position and a retracted position. A sensor is used to monitor an interior area of the cockpit and to determine when a person is entering the cockpit. When it is determined that a person is entering the cockpit, the control system activates movement of the center console from the extended position to the retracted position. Then, the center console is moved from the retracted position back to the extended position and locked into place for flight.

BRIEF DESCRIPTION OF THE DRAWING FIGURES

Embodiments of the invention are described in detail below with reference to the attached drawing figures, wherein:

FIG. 2A shows an example of the center console of FIG. 1 in an extended position.

Figure 1:
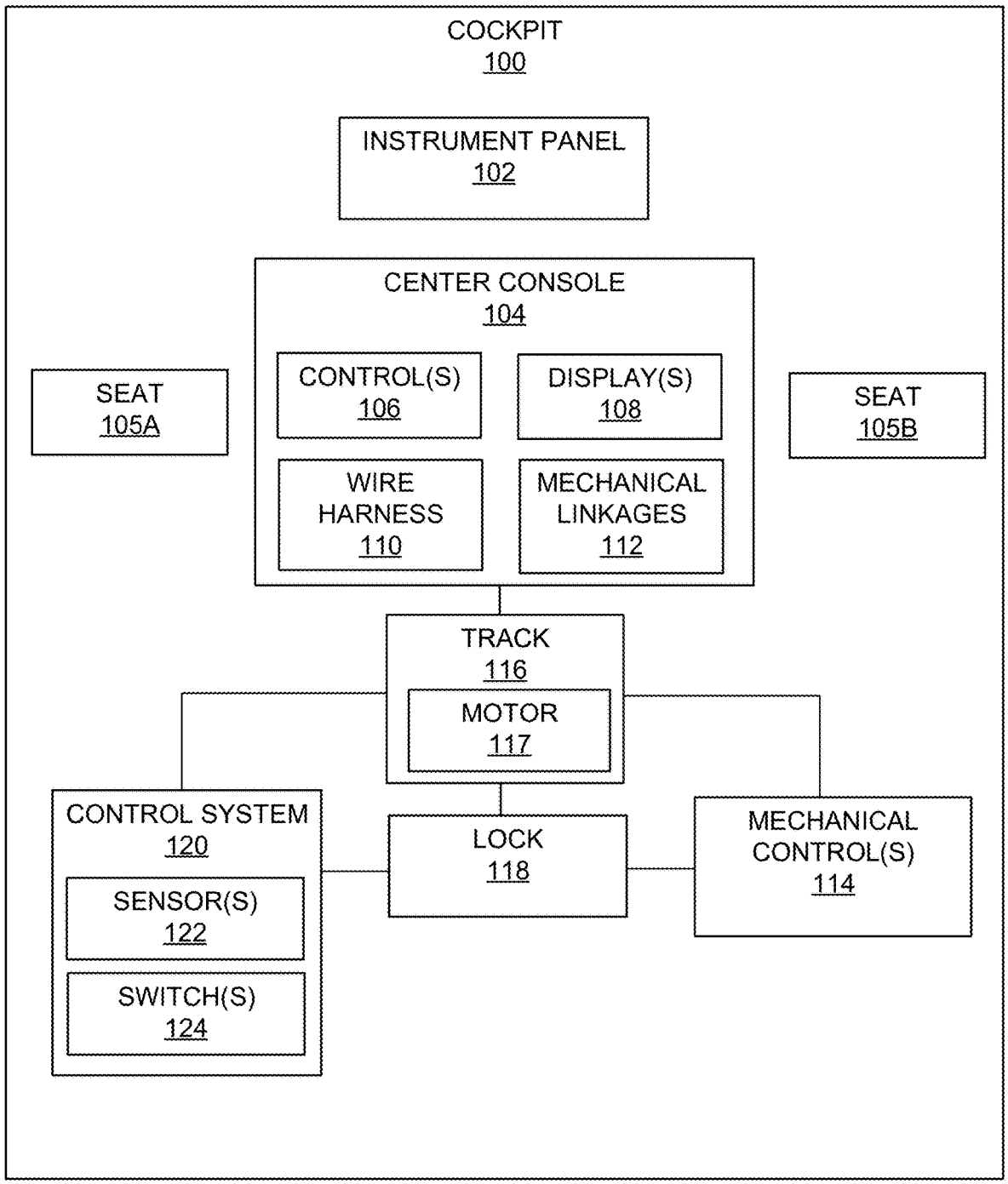
FIG. 1 is a block diagram of a center console system for an aircraft in accordance with the present invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Aircraft are well known in the art include a cockpit having an interior area with operational equipment for one or more pilots/co-pilots to operate the aircraft. Specifically, many conventional cockpits include, among other items, two seats, an instrument panel, and a center console (or power quadrant) positioned substantially between the two seats such that both the pilot and co-pilot have access to the center console. The instrument panel will conventionally house various control interfaces, including screens, knobs, switches, etc. Further, the center console commonly houses and supports various controls and displays, such as a throttle and/or other controls. In a conventional aircraft, the positioning of the center console relative to the seats usually requires that the pilot(s) step and maneuver over the center console to access their seat. In some aircraft, they may hoist themselves over the center console using one or more overhead handles. This maneuvering can be difficult, time consuming, and even dangerous for the pilot(s) as they enter and exit the cockpit.

Accordingly, the present invention provides for an aircraft console system having an automatic retractable console configured to retract upon detection of a pilot entering the cockpit. The aircraft console system uses one or more sensor, such as a motion sensor, to generate a command from a control system to retract the center console to a retracted position (e.g. underneath the instrument panel) which provides more room within the cockpit for the pilot(s) to maneuver. The console system uses the sensor such that retraction is automatic, which provides for efficiency of the system. The console system further includes a lock to lock the center console in the extended position for flight, thereby ensuring access to the center console by the pilot(s). The lock may be electrical, mechanical, or a combination of the two.

In FIG. 1, a block diagram depicts an aircraft console system in accordance with the present invention. The system includes a cockpit 100 represented by the exterior rectangle. Those skilled in the art will appreciate that the cockpit 100 can vary in size, shape, and features as is known for various aircraft without departing from the overall intent of the present invention. The cockpit 100 will house equipment and devices necessary for operation of the aircraft within an interior area of the cockpit, including at least an instrument panel 102 and seats 105A-B.

A center console 104 is positioned within the cockpit 100 and provides a support structure for one or more controls 106, one or more displays 108, and any other aircraft equipment conventionally operated and accessible from a center console or power quadrant. The center console 104 is positioned at least partially between the seats 105A-B such that both a pilot and a co-pilot would have access to the controls 106 and displays 108. Those skilled in the art will appreciate that the center console 104 can vary substantially in design depending on the specific aircraft model.

Figure 2B:
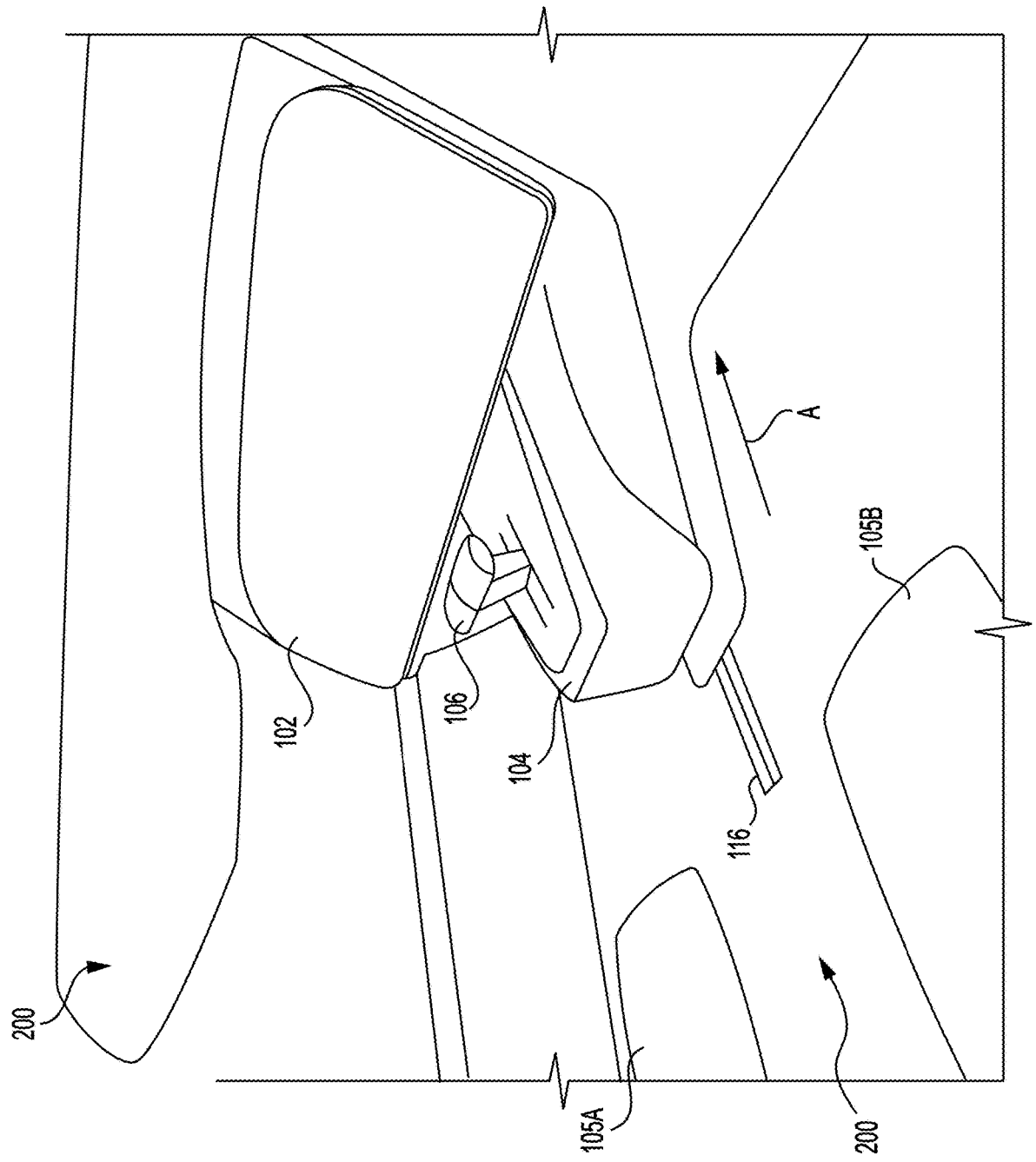
FIG. 2B shows an example of the center console of FIG. 1 in a retracted position.

The center console 104 is mounted on a mechanism configured to provide movement of the center console 104 between an extended position and a retracted position. Specifically, one or more tracks 116 which may vary as would be understood by those skilled in the art, are used to provide said movement. The track 116 may be a floor mounted to a floor surface as shown in FIGS. 2A and 2B, side mounted, or top mounted and can incorporate any configuration of rails, rollers, guides, supports, or other mechanical components necessary to allow for the center console 104 to move from the extended position to the retracted position (see FIGS. 2A and 2B). The track 116, in embodiments, operates via a motor 117, such that the motor 117 will generate the needed power to push/pull the center console 104. The track 116 will also be operable via one or more mechanical controls 114 such that a pilot can manually move the center console 104 along the track, such as through activation of a lever or similar mechanism.

The center console 104 includes a suitable wire harness 110 and/or mechanical linkages 112 that provide control and communication to the control(s) 106 and display(s) 108. The wire harness 110 and/or mechanical linkages 112 are specifically provided with flexibility that allow for the center console 104 to move, without disrupting or jeopardizing the communication.

The console system 120 also includes a control system 120 which provides for operation of the track 116 and accordingly movement of the center console 104. The control system 120 may include any number of computers, hardware components, software components, etc. In addition, the control system 120 may be directly built into one or more flight control computers or be a separate system entirely.

The control system 120 includes one or more sensors 122 configured to detect when a person enters or is entering the cockpit 100. In embodiments, the one or more sensor(s) 122 are motion sensors, which will detect entry through movement. Alternatively, other styles and types of sensors may be used and provide the same functionality. For example, infrared sensors, radar sensors, acoustic sensors, image recognition sensors, weight sensors, etc., may be used alone or in combination to provide for the needed detection of a person entering the cockpit 100. The use of the sensor(s) 122 allows for the system to function automatically and provides automatic retraction of the center console 104. The control system 120, based on detection of movement by the sensor(s) 122 or through other sensed information depending on the embodiment, will generate a command to the track 116 and motor 117 to retract the center console 104 to the retracted position. In embodiments, one or more switches 124 are also provided that allow for user input to retract or extend the center console 104. For example, as a pilot is exiting the cockpit, they may retract the center console 104 for additional room to maneuver out of the cockpit 100.

The aircraft console system further includes a lock 118 for the track 116 such that center console 104 can be locked in a position. The lock 118 may be mechanical, electrical, or a combination of the two and can be activated through one or both of an electrical means, such as one of the switches 124, or one of the mechanical controls 114. The lock 118 ensures that the center console 104 remains in the extended position for flight without accidentally retracting due to movement within the cockpit. The control system 120 can be configured such that the center console 104 automatically returns to the extended position, such as based on a predefined time interval, wherein it will then automatically lock without needed pilot input. As would be appreciated by those skilled in the art, the various controls discussed herein may include communication redundancies, as is common in aircraft control systems, to ensure safe operation of the aircraft.

In FIGS. 2A and 2B, a console system 200 is shown in an extended position (FIG. 2A) and a retracted position (FIG. 2B). Those skilled in the art will appreciate that console system 200 is simplified in FIGS. 2A and 2B merely to show the extended and retracted positions. In FIG. 2A, the center console 104 is extended into an area 200 between the seats 105A, 105B, providing access to at least one of the controls 106 to both the pilot and the co-pilot. Based on a command as generated by the control system 120, the center console 104 will retract, as shown with arrow A, via track 116, to a position below the instrument panel 102 or at least partially below the instrument panel. Accordingly, the area 200 between the seats becomes clear from obstacles. In some embodiments, the console 104 is retracted to a position beyond the front edge of the seats 105A-B as shown, however those skilled in the art will appreciate that the components and positioning shown in FIGS. 2A and 2B are merely exemplary.

Figure 3:
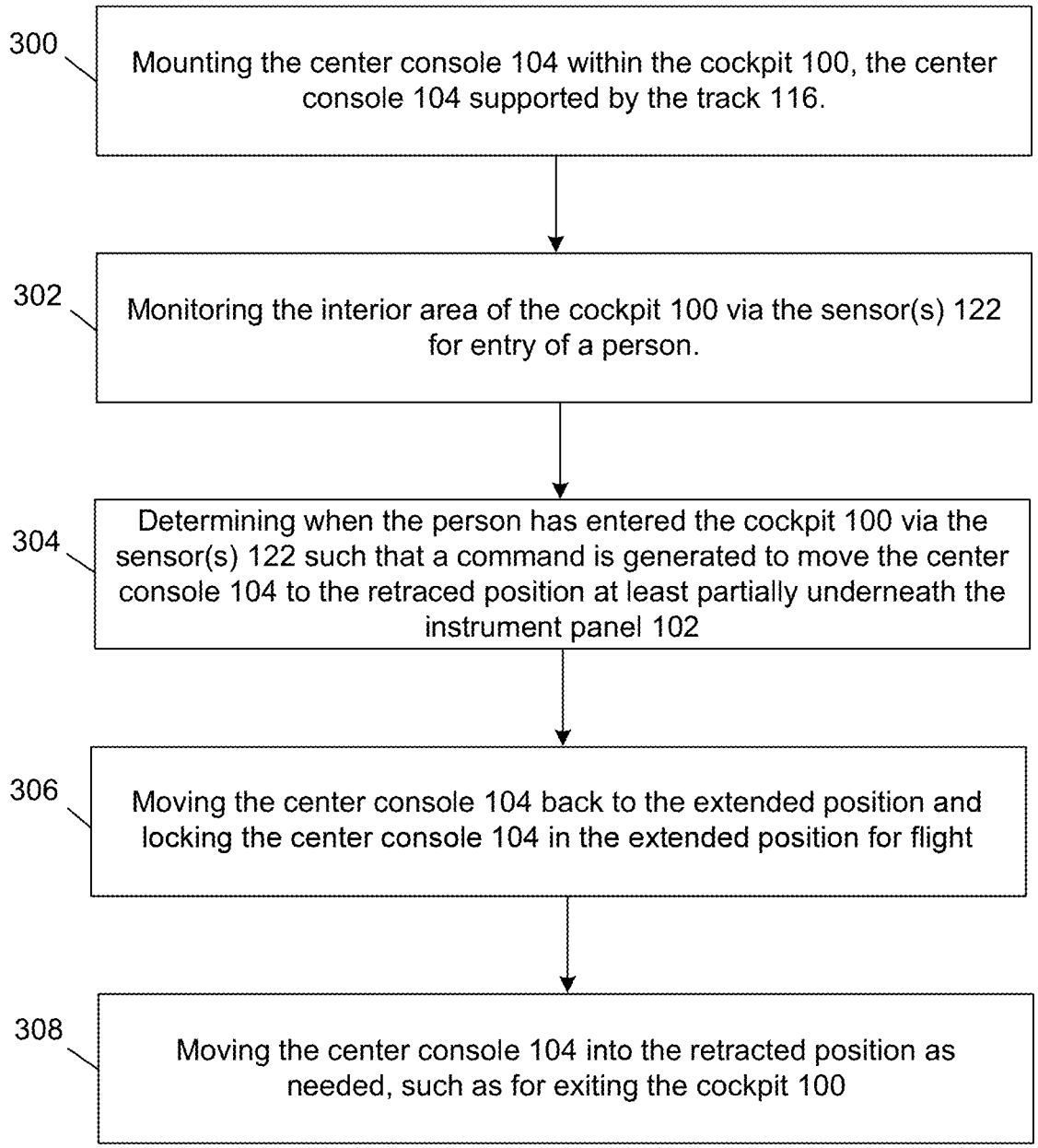
FIG. 3 is a flowchart of a method of easing cockpit ingress and egress utilizing the center console system of FIG. 1.

In FIG. 3, a flowchart depicts a method of easing cockpit 100 ingress and egress. At step 300, the center console 104 is mounted within the cockpit 100 via the track 116. This step is preferably completed during manufacturing of the aircraft and may require one track, a plurality of tracks, or another mechanism configured to facilitate movement of the center console as discussed above. At step 302, the control system 120, through the sensor(s) 122, monitors the cockpit 100 for entry of a person, such as through monitoring for movement within the cockpit 100. At step 304, upon detection of a person entering the cockpit 100, the control system 120 automatically generates a command for the center console 104 to retract, thereby providing additional room for the person to move through the cockpit and access one of the seats. At step 306, the center console 104 is moved back to the extended position to provide access to the control(s) 106 and/or display(s) 108 during flight. At step 308, as needed, the pilot(s) can adjust the position of the center console 104, such as by retracting the center console 104 to provide additional room to exit the cockpit.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A system for retracting a center console of an aircraft having a cockpit with an interior area, the system comprising:
   the center console configured to be positioned within the interior area of the cockpit and supporting one or more aircraft controls;
   a mechanism configured to support the center console and configured to facilitate movement of the center console between an extended position and a retracted position;
   a control system for operating the mechanism, the control system having at least one sensor for monitoring the interior area of the cockpit; and
   wherein the at least one sensor is configured to determine when a person is entering the cockpit;
   wherein the control system is configured to activate movement of the center console to the retracted position upon the at least one sensor determining the person is entering the cockpit.

2. The system of claim 1, further comprising a lock configured to lock the center console at a position.

3. The system of claim 2, wherein the lock is an electrical lock operated via user input through the control system.

4. The system of claim 2, wherein the lock is a mechanical lock operated via user operation of a mechanical control.

5. The system of claim 1, wherein the mechanism supporting the center console comprises one or more tracks.

6. The system of claim 5, wherein the one or more tracks comprises a floor mounted track configured to allow the center console to traverse forward and backward.

7. The system of claim 1, wherein the at least one sensor is a motion sensor, the motion sensor configured to determine when the person is entering the cockpit based on detection of movement within the interior area of the cockpit.

8. The system of claim 1, further comprising a mechanical control for manipulation of the center console from the extended position to the retracted position.

9. The system of claim 1, further comprising a switch as part of the control system, the switch configured to activate movement of the center console to the extended position based on user activation.

10. The system of claim 1, wherein the center console is configured to be positioned within the interior area such that in the extended position the center console extends between a first seat and a second seat and when in the retracted position the center console is retracted such that an area between the first seat and the second seat is clear.

11. A method of easing ingress and egress to and from an interior area of a cockpit, the method comprising:
    mounting a center console within the interior area of the cockpit via a mechanism configured to facilitate movement of the center console between an extended position and a retracted position;
    monitoring, via a sensor, the interior area of the cockpit;
    determining, via the sensor and a control system, when a person is entering the cockpit;
    activating, via the control system, movement of the center console from the extended position to the retracted position;
    activating, via the control system, movement of the center console from the retracted position to the extended position; and
    locking the center console in the extended position for flight.

12. The method of claim 11, wherein monitoring, via the sensor, further comprises monitoring the interior area of the cockpit for movement, wherein the sensor is a motion sensor.

13. The method of claim 11, wherein locking the center console in the extended position for flight is achieved via an electrical lock.

14. The method of claim 11, wherein locking the center console in the extended position for flight is achieved via a mechanical lock.

15. The method of claim 11, wherein the mechanism configured to facilitate movement comprises one or more tracks.

16. The method of claim 15, wherein the one or more tracks comprises a floor mounted track positioned between the center console and a floor surface.

17. The method of claim 11, wherein when in the extended position the center console is positioned substantially between a first seat and a second seat and when in the retracted position the center console is retracted such that an area between the first seat and the second seat is clear.

* * * * *